United States Patent [19]

Hornbaker et al.

[11] Patent Number: 4,467,062

[45] Date of Patent: Aug. 21, 1984

[54] FLAME RETARDED POLYETHYLENE TEREPHTHALATE BLENDS

[75] Inventors: Edwin D. Hornbaker; Jesse D. Jones, both of Baton Rouge, La.

[73] Assignee: Ethyl Corporation, Richmond, Va.

[21] Appl. No.: 524,339

[22] Filed: Aug. 18, 1983

[51] Int. Cl.$^3$ ............................................... C08K 5/34
[52] U.S. Cl. ........................................... 524/89; 524/94
[58] Field of Search ................................... 524/89, 94

[56] References Cited

U.S. PATENT DOCUMENTS

| | | | |
|---|---|---|---|
| 3,313,763 | 4/1967 | Creighton et al. | 524/94 |
| 3,624,024 | 11/1971 | Caldwell et al. | 524/281 |
| 4,140,862 | 2/1979 | Dotson, Jr. et al. | 524/94 |
| 4,346,195 | 8/1982 | Hornbaker et al. | 525/176 |
| 4,366,276 | 12/1982 | Freitag et al. | 524/94 |
| 4,374,220 | 2/1983 | Sonnenberg | 524/412 |
| 4,399,244 | 8/1983 | Bier | 524/89 |

*Primary Examiner*—Lester L. Lee
*Attorney, Agent, or Firm*—Donald L. Johnson; John F. Sieberth; Teresa M. Stanek

[57] ABSTRACT

Flame retarded thermoplastic compositions which comprise in intimate admixture: (a) a polyethylene terephthalate, (b) a copolymer of a vinyl aromatic compound and an alpha,beta-unsaturated cyclic anhydride, said copolymer being a rubber-modified graft copolymer or a rubber-free copolymer, (c) a bis-imide flame retardant having at least 8 halogen atoms in the molecule bonded to carbon atoms of aromatic ring systems, (d) optionally, an inorganic synergist for said flame retardant. The compositions preferably contain an impact modifier as well.

20 Claims, No Drawings

FLAME RETARDED POLYETHYLENE TEREPHTHALATE BLENDS

In our U.S. Pat. No. 4,346,195, the disclosure of which is incorporated herein by reference, thermoplastic compositions comprising (a) a polyethylene terephthalate (e.g., PET) and (b) a copolymer, preferably a rubber-modified graft copolymer, of a vinyl aromatic compound and an alpha,beta-unsaturated cyclic anhydride are disclosed. These compositions, examples of which include PET in intimate admixture with styrene-maleic anhydride copolymers (SMA copolymer), exhibit good heat deflection temperatures (HDT). It is also taught that these thermoplastic compositions can contain other additives, such as, for example, impact modifiers and flame retardants.

When additives are utilized in novel thermoplastic compositions, such as those described above, it is of course always highly desirable that the physical properties of those compositions not be adversely affected. Thus, for example, when a composition is wanted that is resistant to combustion a flame retardant would be added. The most suitable type of flame retardant or flame retardant system would be one that would be effective enough to enable the compositions to achieve a V-0 rating in the standard UL-94 test procedure without reducing the achieved desirable physical properties of the composition, e.g., HDT.

The Invention

In accordance with this invention novel linear aromatic polyester blends are provided. These blends are characterized by having excellent fire retardant properties. At the same time the blends of this invention have physical properties (e.g., HDT) essentially as good as the corresponding blends which do not possess these fire retardant properties.

More specifically this invention provides a flame retarded thermoplastic composition which comprises in intimate admixture:
(a) a polyethylene terephthalate,
(b) a copolymer of a vinyl aromatic compound and an alpha,beta-unsaturated cyclic anhydride, said copolymer being a rubber-modified graft copolymer or a rubber-free copolymer,
(c) a bis-imide flame retardant having at least 8 halogen atoms in the molecule bonded to carbon atoms of aromatic ring systems and
(d) optionally, but preferably, an inorganic synergist for said flame retardant.

Preferably, the above blends also contain an impact modifier.

The polyethylene terephthalate used herein is preferably homopolymeric PET. Halogenated PET can also be used and is normally formed by condensation of a mixture of a halogenated, preferably brominated, terephthalic acid (e.g., 2,5-dibromoterephthalic acid and 2,3,5,6-tetrabromoterephthalic acid) and terephthalic acid with ethylene glycol. Additionally, the polyethylene terephthalate used herein can also contain up to 10 mol percent, relative to the acid component, of radicals of other aromatic dicarboxylic acids such as, for example, phthalic acid, isophthalic acid, naphthalene-2,6-dicarboxylic acid, diphenyl-4,4'-dicarboxylic acid and the like as well as their halogenated counterparts. The copolymers can also contain up to 10 mol percent, relative to the glycol component, of radicals of other glycols such as, for example, propylene glycol, butylene glycol, dibromoneopentyl glycol, bis(2-hydroxyethyl) ether of tetrabromobisphenol A and tetrabromo-p-xylylene glycol. See for example Kirk-Othmer, *Encyclopedia of Chemical Technology*, Second Edition, Vol. 16, pp. 161-173 (1968).

The polyethylene terephthalates used herein should be moldable (i.e., injection moldable or moldable by extrusion), and thus generally will have an intrinsic viscosity (I.V.) falling between about 0.25 and 1.5, and more usually between about 0.5 and 1.2, as measured at 25° C. using a solvent consisting of 60 percent by weight phenol and 40 percent by weight of tetrachloroethane. For best results the polyethylene terephthalate should have an I.V. (measured in the foregoing manner) in the range of 0.4 to 1.2, more preferably between 0.5 and 1.1, and for most injection molding applications polyethylene terephthalates in which the I.V. is in the range of 0.5 to 0.9 are deemed most desirable.

The amount of polyethylene terephthalate resin used in the blends of this invention preferably falls within the range of from about 10 to about 90 weight percent based on the total weight of resin in the blend and the amount of the unsaturated cyclic anhydride copolymer falls within the range of from about 90 to about 10 weight percent also based on the total weight of resin in the blend. In a particularly preferred embodiment the relative amounts of the PET and the copolymer fall within the range of from about 20 to about 80 and from about 80 to about 20 weight percent, respectively, the total being equal to 100. Most preferably the amounts used fall within the range of 30 to 70 and from about 70 to 30 weight percent, respectively.

Copolymers of a vinyl aromatic compound and an alpha,beta-unsaturated cyclic anhydride are well known in the art and are described in the literature. In general, they are prepared by conventional bulk or solution techniques using free-radical initiation. For example, two-component styrene-maleic anhydride copolymers can be obtained by simply reacting the two monomers, i.e., styrene and maleic anhydride, at 50° C. in the presence of benzoyl peroxide. The rate of polymerization may be better controlled if a solvent such as acetone, benzene or xylene is used.

Vinyl aromatic compounds of component (b) can be derived from compounds of the formula:

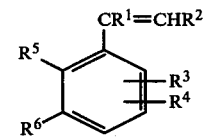

where
$R^1$ and $R^2$ are selected from the group consisting of (lower) alkyl groups of from 1 to 6 carbon atoms and hydrogen.
$R^3$ and $R^4$ are selected from the group consisting of chloro, bromo, hydrogen and (lower) alkyl of from 1 to 6 carbon atoms;
$R^5$ and $R^6$ are selected from the group consisting of hydrogen and (lower) alkyl groups of from 1 to 6 carbon atoms or $R^5$ and
$R^6$ may be concatenated together with hydrocarbyl groups to form a naphthyl group. These compounds are free of any substituent that has a tertiary carbon atom. Mixtures of various styrenic monomers may be used, e.g., styrene and 4-methylstyrene, etc. Styrene is the preferred vinyl aromatic compound.

The cyclic anhydride compounds of component (b) are preferably alpha,beta-unsaturated dicarboxylic anhydrides. For example, the term cyclic anhydride identifies anhydrides having the formula:

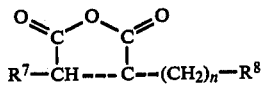

wherein the dotted lines represent a single or a double carbon-to-carbon bond, $R^7$ is selected from the group consisting of hydrogen, alkyl or aryl radicals containing up to 8 carbon atoms, $R^8$ is selected from the group consisting of hydrogen, vinyl, alkyl, alkenyl, alkylcarboxylic or alkenylcarboxylic of from 1 to 12 carbon atoms and n is an integer of from 0 to about 10. Examples include maleic anhydride, methyl maleic anhydride (also known as citraconic anhydride), dimethyl maleic anhydride, itaconic anhydride, phenylmaleic anhydride, aconitic anhydride, and mixtures thereof. Maleic anhydride is the preferred anhydride of component (b).

Preferred copolymers of (b) are copolymers consisting essentially of styrene and maleic anhydride, e.g., two-component copolymers, three-component copolymers, and like copolymers of at least these two comonomers.

Copolymers of vinyl aromatic compounds and alpha,beta-unsaturated cyclic anhydrides which can be used are described in U.S. Pat. Nos. 2,769,804; 2,971,939 and 3,336,267, the disclosures of which are incorporated herein by reference.

In preparing the rubber-modified copolymer use of such rubbers as polybutadiene, an isobutylene-isoprene copolymer, a styrene-butadiene copolymer, a butadiene-acrylonitrile copolymer, an ethylene-propylene copolymer, a polyisoprene, ethylene-propylene-diene monomer terpolymer (EPDM) and the like can be employed. For a description of a typical method of preparing the rubber-modified graft copolymers see U.S. Pat. No. 3,919,354 which is incorporated herein by reference.

Component (b) copolymers can comprise from about 40 to about 5 percent by weight of the alpha,beta-unsaturated cyclic anhydride and from about 60 to about 95 percent by weight of a vinyl aromatic compound in the resin phase and, when rubber is present, up to 50 percent by weight of rubber in the total graft copolymer. Preferred rubber-modified copolymers used herein contain about 5 to about 35 and more preferably about 10 to about 30 percent by weight of the alpha,beta-unsaturated cyclic anhydride and about 95 to about 65 percent by weight and more preferably about 90 to about 70 percent by weight of the vinyl aromatic compound in the resin phase and from about 4 to about 30 percent by weight of rubber in the total graft copolymer. Preferred rubber-free copolymers used herein contain from about 5 to about 35 and more preferably about 10 to about 30 percent by weight of the alpha,beta-unsaturated cyclic anhydride and from about 95 to about 65 percent and more preferably about 90 to about 70 percent by weight of a vinyl aromatic compound.

Rubber-modified graft vinyl aromatic alpha,beta-unsaturated cyclic anhydride copolymers utilizable in the compositions of this invention are available, for example, from ARCO Polymers, Inc (ARCO). Examples of styrene-maleic anhydride copolymers from ARCO include: DKB-218, reported to comprise in the resin phase 17% by weight maleic anhydride and 83 percent by weight styrene and 10 percent by weight of rubber in the total graft copolymer; DYLARK 338S, reported to comprise in the resin phase 14 percent by weight maleic anhydride and 86 percent by weight styrene and 4 percent by weight of rubber in the total graft copolymer; DYLARK 350, reported to comprise in the resin phase 13 percent by weight maleic anhydride and 87 percent by weight styrene and 15 percent by weight of rubber in the total graft copolymer; and DYLARK 378, believed to have the same proportions of styrene, maleic anhydride and rubber as DYLARK 350. Another useful SMA copolymer is Dow Experimental Resin XP-5272.08 made by Dow Chemical Company. This is a high impact styrene-maleic anhydride copolymer believed to contain about 23 percent by weight of maleic anhydride and about 77 percent by weight of styrene in the resin phase and about 15 percent by weight of polybutadiene in the total graft copolymer.

Examples of nonrubber-modified copolymers of (b) include: DYLARK DKB 290, reported to comprise about 18 percent by weight maleic anhydride and about 82 percent by weight styrene; DYLARK 332, reported to comprise about 14 percent by weight maleic anhydride and 86 percent by weight styrene and DYLARK DKB 134 reported to comprise about 17 percent by weight maleic anhydride, the balance being styrene.

The flame retardants used in the compositions of this invention are bis-imides having at least 8 halogen atoms—preferably bromine or chlorine or both—bonded to carbon atoms of aromatic ring systems. These halogenated bis-imides are well known in the art, see for example, U.S. Pat. No. 4,374,220, the disclosure of which is incorporated herein by reference. Examples include, but are not limited to:
N,N'-(p and m-phenylene)-bis[3,4,5,6-tetrachlorophthalimide]
N,N'-(p and m-phenylene)-bis[3,4,5,6-tetrabromophthalimide]
N,N'-(methylene-di-p-phenylene)-bis[3,4,5,6-tetrachlorophthalimide]
N,N'-(methylene-di-p-phenylene)-bis[3,4,5,6-tetrabromophthalimide]
N,N'-(oxy-di-p-phenylene)-bis[3,4,5,6-tetrachlorophthalimide]
N,N'-(oxy-di-p-phenylene)-bis[3,4,5,6-tetrabromophthalimide]
N,N'-(p and m-tetrachloroxylylene)-bis[3,4,5,6-tetrabromophthalimide]
N,N'-bis(1,2,3,4,5-pentabromobenzyl)-pyromellitimide, and
N,N'-(p and m-tetrachloroxylylene)-bis[3,4,5,6-tetrachlorophthalimide] in which the tetrahaloxylylene radicals are 1,2,4,5-tetrahaloxylene and 1,3,4,5-tetrahaloxylene radicals.

A preferred flame retardant is N,N'-(1,2-ethylene)bis-[3,4,5,6-tetrabromophthalimide] also known as N,N'-ethylenebis(tetrabromophthalimide).

The flame retardants are preferably present in amounts within the range of from about 8 to about 20 percent by weight of the composition, more preferably from about 8 to about 18 percent and most preferably from about 8 to about 16 percent with from about 10 to about 14 percent being even more preferred.

Although optional, synergists which are compounds, especially oxides, of a Group V element are preferably used in combination with the bis-imide flame retardants. Examples include the oxides of bismuth, arsenic, phosphorus and especially antimony. Antimony oxide ($Sb_2O_3$) is a particularly preferred synergist. The synergist is preferably present in amounts within the range of from about 4 to about 10 percent by weight of the composition, more preferably from about 4 to about 9 percent and most preferably from about 4 to about 8 percent with from about 5 to about 7 percent being even more preferred.

Compositions of this invention can also include other ingredients, such as extenders, processing aids, pigments, stabilizers and the like, for their conventionally employed purposes. Other flame retardants may also be included in the compositions of this invention. Reinforcing fillers, in amounts sufficient to impart reinforcement, can be used, such as carbon filaments; silicates, e.g., acicular calcium silicate; asbestos; titanium dioxide; potassium titanate; titanate whiskers; and glass flakes and/or fibers.

Particularly preferred compositions of this invention include those containing impact modifiers. Examples include ethylene/vinyl acetate copolymers, ethylene/acrylic acid copolymers (having some of the acid functions neutralized), ethylene/methacrylic acid copolymers (having some of the methacrylic acid functions neutralized), ethylene/alkyl acrylate/methacrylic acid terpolymer (also having some of the methacrylic acid functions neutralized), ABS, oxidized polyethylene, styrene-butadiene-styrene (S-B-S) block copolymers, styrene/butadiene multiblock copolymers, styrene/butadiene radical block copolymers, hydrogenated S-B-S block copolymers, styrene/butadiene rubber, acrylic rubbers, EPDM, ethylene/acrylic acid copolymers, ethylene/methyl acrylate copolymers, ethylene/ethyl acrylate copolymers, polyester-ether multiblock copolymers, and the like. These materials are available in a wide range of molecular weights and it is generally desirable that the impact modifier, when used, have a melt viscosity close to that of the substrate. Amounts of impact modifiers generally fall within the range of from about 5 to about 40 percent by weight. The results obtained in any given situation will, of course, depend upon a variety of factors such as the impact modifier selected, the manner by which it is compounded into the blends, the concentration in which it is employed, and indeed upon the criteria used in measuring or judging the toughness of the resultant blend. On the basis of the work performed thus far, the most preferred impact modifiers are the polyethylene-ester segmented block copolymers, a number of which are available commercially from du Pont under the trademark Hytrel. The composition and synthesis of these copolyetherester block copolymers have been described in the literature—see for example U.S. Pat. Nos. 3,784,520; 3,766,146 and 3,763,109, the disclosures of which are incorporated herein by reference. Note also the test of U.S. Pat. No. 4,259,458 from Column 13, line 15 through Column 17, line 23 which likewise is incorporated herein by reference.

For protection against thermo-oxidative degradation, the customary amounts of stabilizers, preferably 0.001 to 0.5 percent by weight, relative to the unfilled and unreinforced compositions of this invention, can be added to the compositions according to the invention. Examples of suitable stabilizers are phenols and phenol derivatives, preferably sterically hindered phenols which contain alkyl substituents with 1–6 carbon atoms in the two positions ortho to the phenolic hydroxyl groups, amines, preferably secondary arylamines and their derivatives, phosphates and phosphites, preferably the aryl derivatives thereof and quinones. Non-limiting examples include 4,4'-bis-(2,6-di-tert-butylphenol); 1,3,5-trimethyl-2,4,6-tris(3,5-di-tert-butyl-4-hydroxybenzyl)benzene; 4,4'-butylidene-bis(6-tert-butyl-m-cresol); 3,5-di-tert-butyl-4-hydroxybenzylphosphonic acid diethyl ester; N,N'-bis(beta-naphthyl)-p-phenylenediamine; N,N'-bis-(1-methyl-heptyl)-p-phenylenediamine; phenyl-beta-naphthylamine; 4,4'-bis-(alpha,alpha-di-methylbenzyl)diphenylamine; hydroquinone; p-benzoquinone; toluhydroquinone; p-tert-butylpyrocatechol; chloranil; and naphthoquinone.

Preferred reinforcing fillers are fiberglass, mineral fillers, particulate fillers such as mica and the like. In general, optimum physical properties can be obtained if glass filaments are employed in amounts of from about 5 to about 40 percent by weight, based on the combined weight of glass and resin. However, higher amounts can be used.

Compositions of the invention may be prepared by blending the components in a mixer (e.g., a Henschel mixer) and compounding the mixture on an extruder (using, for example, a twin-screw compounding extruder such as a 28 mm Werner-Pfleiderer extruder or the like). Thereafter, the extrudate is chopped into pellets and molded on an injection molding machine.

The present invention is further illustrated in the following examples, which are not to be construed as limiting.

EXAMPLES 1 AND 2 AND COMPARATIVE EXAMPLES 3 AND 4

The compositions of the Examples in the Table were prepared by mixing the components to form a premix, compounding the premix on a 1½" NRM extruder without the screen pack at temperatures about 525° F. to 550° F. and molding the pellets into test bars on a Cincinnati Milacron injection molding machine at a mold temperature of 140° F.

The particular materials used in these compositions were as follows:

Polyethylene terephthalate; from Goodyear Tire and Rubber Company; VITUF 5901 having an intrinsic viscosity of 0.59 as measured at 25° C. using a solvent consisting of 60 percent by weight phenol and 40 percent by weight of tetrachloroethane.

Styrene/maleic anhydride copolymer; from ARCO/Polymers Inc.; DYLARK 338S.

N,N'-ethylene-bis[tetrabromophthalimide]; from Saytech, Inc., SAYTEX BT 93 Flame Retardant.

Antimony Oxide ($Sb_2O_3$); THERMOGUARD S.

Impact Modifier; HYTREL 4056, a polyether-ester segmented block copolymer.

Test bars of the compositions of Examples 1–4 were tested for flame retardancy in accordance with Underwriter Laboratory's standard UL-94 test procedure. The highest rating is V-0 which indicates the test bar resists burning. The lowest rating is HB which indicates Horizontal Burn. The HB rating means the test bar fails to qualify for a V rating.

Test bars of the above compositions were also tested according to ASTM procedures to evaluate physical properties. The ASTM designation numbers for the properties measured were as follows: Flexural Strength (Flex Strength) and Flexural Elastic Modulus (Flex Modulus)—D 790-71 (1978); Izod Impact for ¼" bar and ⅛" bar—D 256-78; Heat Deflection Temperature—D 643-72 (1978). The results are shown in the Table.

TABLE I

Flame Retarded PET Compositions

| | Example 1 | Comparative Example 3 | Example 2 | Comparative Example 4 |
|---|---|---|---|---|
| Composition, % by weight | | | | |
| Polyethylene terephthalate | 57.4 | 70 | 51.7 | 63 |
| Styrene-Maleic anhydride copolymer | 24.6 | 30 | 22.1 | 27 |
| Impact modifier | — | — | 8.2 | 10 |
| N,N'—Ethylenebis-(tetrabromophthalimide) | 12.0 | — | 12.0 | — |
| Antimony oxide | 6.0 | — | 6.0 | — |
| Properties: | | | | |
| Flex Strength, $10^3$ psi | 8.4 | 12.0 | 7.3 | 11.0 |
| Flex Modulus, $10^5$ psi | 4.79 | 4.47 | 3.25 | 3.26 |
| Izod Impact, ft-lb/in: | | | | |
| ¼" bar | 0.3 | 0.4 | 0.7 | 1.0 |
| ⅛" bar | 0.3 | 0.4 | 0.5 | 1.0 |
| HDT @ 264 psi, °C. | 85 | 85 | 76 | 76 |
| HDT @ 264 psi, °C. (Duplicate) | 86 | 88 | 75 | 78 |
| UL-94 Rating @ ⅛" | V-O | HB | V-O | HB |

Examples 1 and 2 demonstrate the excellent flame retardancy of the compositions of this invention. In addition, the data given in the Table show that use of the bis-imide flame retardant and synergist does not substantially adversely affect the properties of the blends, e.g., HDT, of the compositions they are added to.

What is claimed is:

1. A flame retarded thermoplastic composition which comprises in intimate admixture:
   (a) a polyethylene terephthalate,
   (b) a copolymer of a vinyl aromatic compound and an alpha,beta-unsaturated cyclic anhydride, said copolymer being a rubber-modified graft copolymer or a rubber-free copolymer,
   (c) a bis-imide flame retardant having at least 8 halogen atoms in the molecule bonded to carbon atoms of aromatic ring systems, and
   (d) optionally, an inorganic synergist for said flame retardant.

2. The composition of claim 1, wherein said flame retardant is N,N'-ethylenebis(tetrabromophthalimide).

3. The composition of claim 1, wherein (b) is a rubber-free copolymer.

4. The composition of claim 1, wherein (b) is a rubber-modified graft copolymer.

5. The composition of claim 1, wherein (b) is a rubber-modified graft copolymer of at least one styrene monomer and maleic anhydride.

6. The composition of claim 1, wherein (b) contains about 5 to about 35 percent by weight of said cyclic anhydride and about 95 to about 65 percent by weight of said vinyl aromatic compound in the resin phase and about 4 to about 30 percent by weight of rubber in the total graft copolymer.

7. The composition of claim 1, containing from about 8 to about 20 percent by weight of said flame retardant.

8. The composition of claim 1, containing from about 4 to about 10 percent by weight of said synergistic compound.

9. The composition of claim 1, wherein the relative proportions of (a) and (b) fall within the range of from about 20 to about 80 weight percent of (a) with from about 80 to about 20 weight percent of (b), the total of (a) and (b) being equal to 100.

10. The composition of claim 1, wherein said polyethylene terephthalate has an intrinsic viscosity of between about 0.5 and 1.2 as measured at 25° C. using a solvent consisting of 60 percent by weight phenol and 40 percent by weight of tetrachloroethane.

11. The composition of claim 1, wherein (b) consists essentially of a rubber-modified graft copolymer of styrene and maleic anhydride.

12. The composition of claim 11, wherein (b) contains about 5 to about 35 percent by weight of maleic anhydride and about 95 to about 65 percent by weight of styrene in the resin phase and about 4 to about 30 percent by weight of rubber in the total graft copolymer.

13. The composition of claim 1 additionally containing an impact modifier.

14. A flame retarded thermoplastic composition which comprises in intimate admixture:
   (a) a polyethylene terephthalate having an intrinsic viscosity of between about 0.5 and 1.2 as measured at 25° C. using a solvent consisting of 60 percent by weight phenol and 40 percent by weight of tetrachloroethane,
   (b) a rubber-modified graft copolymer of a vinyl aromatic compound and an alpha,beta-unsaturated cyclic anhydride,
   (c) a bis-imide flame retardant having at least 8 halogen atoms in the molecule bonded to carbon atoms of aromatic ring systems, and
   (d) an inorganic synergist for said flame retardant.

15. The composition of claim 14, wherein said synergist is $Sb_2O_3$.

16. The composition of claim 14, wherein said flame retardant is N,N'-ethylenebis(tetrabromophthalimide) and said synergist is $Sb_2O_3$.

17. The composition of claim 16, wherein the relative proportions of (a) and (b) fall within the range of from about 20 to about 80 weight percent of (a) with from about 80 to about 20 weight percent of (b), the total of (a) and (b) being equal to 100, wherein (c) is present in an amount of about 8 to about 20 percent by weight, wherein (d) is present in an amount of about 4 to about 10 percent by weight, both (c) and (d) being based on the weight of the total composition and wherein (b) is a rubber-modified graft copolymer of a styrene and maleic anhydride, such copolymer having about 5 to about 35 percent by weight of maleic anhydride and about 95 to about 65 percent by weight of styrene in the resin phase and about 4 to about 30 percent by weight of rubber in the total graft copolymer.

18. A flame retarded thermoplastic composition which comprises in intimate admixture:
   (a) a polyethylene terephthalate having an intrinsic viscosity of between about 0.5 and 1.2 as measured at 25° C. using a solvent consisting of 60 percent by weight phenol and 40 percent by weight of tetrachloroethane,
   (b) a rubber-modified graft copolymer consisting essentially of styrene and maleic anhydride, said copolymer having about 5 to about 35 percent by weight of maleic anhydride and about 95 to about 65 percent by weight of styrene in the resin phase and about 4 to about 30 percent by weight of rubber in the total graft copolymer, (c) a copolyetherester segmented block copolymer impact modifier, (d) a bis-imide flame retardant having at least 8 halogen atoms in the molecule bonded to carbon atoms of aromatic ring systems, said flame retardant being present in an amount of about 8-20 percent by weight of the total composition, and (e) an inorganic synergist for said flame retardant, said synergist being present in an amount of about 4–10 percent by weight of the total composition, wherein the relative proportions of (a) and (b) fall within the range of about 20 to about 80 weight percent of (a) with from about 80 to about 20 weight percent of (b), the total of (a) and (b) being equal to 100.

19. The composition of claim 18, wherein (d) is N,N'-ethylenebis(tetrabromophthalimide) and (e) is $Sb_2O_3$.

20. The composition of claim 18, wherein said copolyetherester segmented block copolymer has approximately 50 mole percent polyether segments.

* * * * *